United States Patent
Millet et al.

(10) Patent No.: US 8,830,843 B2
(45) Date of Patent: Sep. 9, 2014

(54) WIDEBAND FAULT CORRELATION SYSTEM

(75) Inventors: Mark Millet, Mountain View, CA (US); Harshavardhan Parandekar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 516 days.

(21) Appl. No.: 12/395,120

(22) Filed: Feb. 27, 2009

(65) Prior Publication Data

US 2010/0223650 A1 Sep. 2, 2010

(51) Int. Cl.
*G01R 31/08* (2006.01)
*H04J 3/16* (2006.01)

(52) U.S. Cl.
USPC .......................................... 370/242; 370/468

(58) Field of Classification Search
None
See application file for complete search history.

(56) References Cited

U.S. PATENT DOCUMENTS

| | | |
|---|---|---|
| 6,588,016 B1 | 7/2003 | Chen et al. |
| 6,782,884 B1 | 8/2004 | Chen et al. |
| 6,973,668 B1 * | 12/2005 | Chen et al. ................... 725/111 |
| 7,227,889 B1 | 6/2007 | Roeck et al. |
| 7,443,873 B1 * | 10/2008 | Beser ............................ 370/432 |
| 7,843,963 B1 * | 11/2010 | Dispensa et al. .............. 370/468 |
| 2002/0101883 A1 * | 8/2002 | Ruszczyk et al. ............. 370/503 |
| 2004/0163129 A1 * | 8/2004 | Chapman et al. ............. 725/126 |
| 2005/0052992 A1 * | 3/2005 | Cloonan et al. ............... 370/229 |
| 2009/0103557 A1 * | 4/2009 | Hong et al. .................... 370/431 |
| 2009/0175174 A1 * | 7/2009 | Semon et al. ................. 370/241 |
| 2010/0142553 A1 * | 6/2010 | Kolze ............................ 370/468 |
| 2011/0206103 A1 * | 8/2011 | Beser ............................ 375/222 |

* cited by examiner

*Primary Examiner* — Jutai Kao
(74) *Attorney, Agent, or Firm* — Leon R. Turkevich

(57) ABSTRACT

A wideband cable network system includes multiple wideband cable modems and a Wideband Cable Modem Termination System (WCMTS). The WCMTS operates a Media Access Control (MAC) layer that communicates with the cable modems over multiple different downstream Radio Frequency (RF) channels and upstream RF channels. A wideband failure analytic manager tracks fault indicators associated with the MAC layer communications. Separate failure analytics are then generated, indexed, and correlated for different cable modems and different upstream or downstream channels.

17 Claims, 7 Drawing Sheets

WIDEBAND FAULT CORRELATION SYSTEM

BACKGROUND

A two-way Hybrid Fiber-Coaxial (HFC) cable system includes a Cable Modem Termination System (CMTS). The CMTS converts digital signals into a modulated Radio Frequency (RF) signal which is carried over optical fiber and coaxial lines to cable modems at different subscriber locations. The cable modems demodulate the RF signal and feed the demodulated digital data to a computer. On a return path, the operations are reversed. Digital data is fed to the cable modem which modulates the digital data with an RF signal. The CMTS demodulates the RF signal received from the cable modem and transmits the digital data to an endpoint over a Wide Area Network (WAN).

Flap lists have been used to identify and track cable modems that experience intermittent connectivity problems. A Media Access Control (MAC) layer keeps a miss count that reflects the number of times the CMTS fails to receive a polling message from the cable modem during an allotted time slot. The miss count is tabulated in a form that can be analyzed to determine failure characteristics of the cable television plant.

The cable TV industry has been upgrading its signal distribution and transmission infrastructure. For example, Data Over Cable Service Interface Specification (DOCSIS) 3.0 introduces the concept of multiple bonded RF channels to the legacy DOCSIS architecture. Unlike single channel devices, the multi-channel/wideband devices will not go offline or lose all connectively when some of the bonded channels fail. Thus, existing cable modem failure analysis schemes may not contain complete and pertinent data for these wideband related failures.

DETAILED DESCRIPTION

Figure 1:
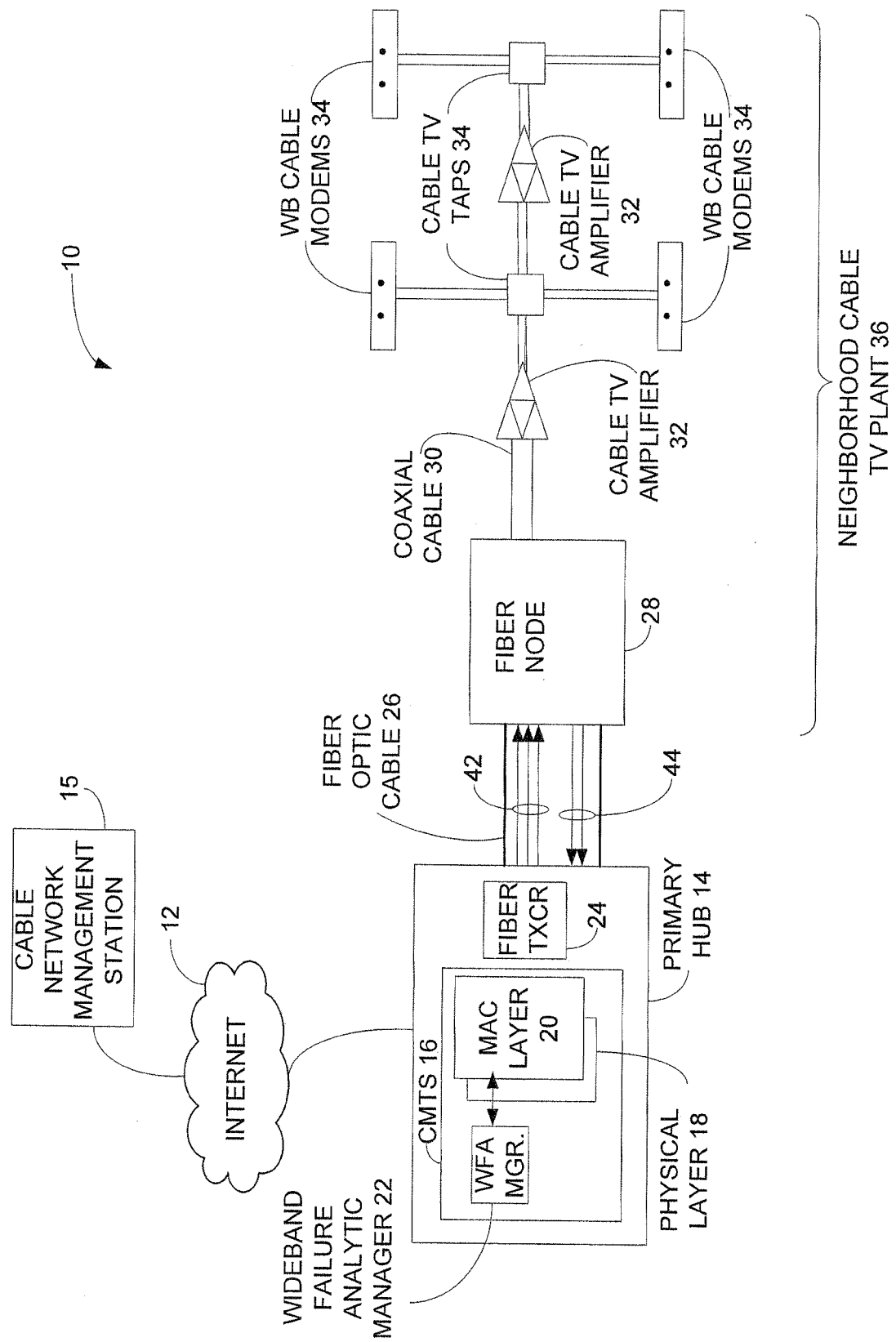
FIG. 1 is a block diagram of a wideband cable modem system that uses a wideband failure analytic manager.

FIG. 1 is a block diagram of a multi-channel (wideband) two-way Hybrid Fiber-Coaxial (HFC) cable system 10. The main distribution component of the HFC cable system 10 is a primary (or secondary) hub 14 that can service thousands of subscribers or end-users. A Wideband Cable Modem Termination System (WCMTS) 16 in the hub 14 transmits data over multiple downstream Radio Frequency (RF) channels 42 to multiple wideband cable modems 34 and receives data from the wideband cable modems 34 over multiple different upstream RF channels 44. Bandwidth is increased in the downstream path of the cable system 10, since the CMTS 16 can transmit data on multiple different RF channels 42 at the same time to the same or different cable modems 34. Similarly, bandwidth is increased in the upstream path, since the cable modems 34 can transmit data on multiple different upstream RF channels 44 at the same time to the CMTS 16.

A fiber transceiver 24 converts electrical signals into optical signals for transmission over a fiber optic cable 26. The fiber optic cable 26 is typically a pair of cables, each cable carrying data over multiple different RF frequencies in different upstream or downstream directions. When the data reaches a particular neighborhood cable TV plant 36, a fiber node 28 converts the data into electrical signals that are transmitted over a coaxial cable 30, also referred to as a trunk line.

Primary hub 14 can support hundreds of fiber nodes 28 and each fiber node 28 can support hundreds of cable modems 34 at different subscriber locations. Thus, there are normally multiple fiber optic cables 26 emanating from hub 14 to an equal number of fiber nodes 28. Cable TV (CTV) taps 34 distribute signals for each of the downstream RF channels 42 to individual cable modems 34. Two-way cable TV amplifiers 32 amplify the multiple different downstream and upstream RF signals carried over the coaxial cables 30 between the cable modems 34 and hub 14.

All of the components in the wideband cable system 10, such as the fiber transceiver 24, fiber node 28, amplifiers 32, and taps 34 are configured to handle multiple upstream and downstream RF channels. However, it should be understood that many of the operations described below can also be performed with a narrowband cable system that uses a single downstream channel and a single upstream channel. The operations described below can also operate with a cable system that operates in both a wideband and narrowband mode.

The cable modems 34 demodulate the multiple different RF signals into digital data. The demodulated digital data is then supplied to a computer or Set-Top Box (STB) (not shown). The cable modems 34 modulate digital data received from the computer or STB onto the multiple RF signals associated with the upstream channels 44 for transmission to hub 14. This wideband modulation/demodulation is performed by the cable modems 34 at subscriber locations such as homes or offices and is also performed by the wideband CMTS 16 located at the hub 14.

A MAC layer 20 in CMTS 16 attaches cable modem addresses to data packets transmitted on the downstream channels 42 to the cable modems 34. There is also a MAC device 55 (FIG. 2) operating in the cable modems 34 that encapsulates data packets transmitted on the upstream channels 44 with the address of hub 14. The CMTS 16 also has a physical layer 18 that is responsible for keeping a list of cable modem addresses and encapsulating data with appropriate destination addresses.

Each cable modem 34 in the cable system 10 has its own MAC address. Whenever a new cable modem is installed, its address is registered with the MAC layer 20. The MAC address distinguishes data going to and from the cable modems 34 since the cable modems 34 share common downstream and upstream paths 42 and 44, respectively. Thus, data packets, regardless of format, are mapped to particular MAC addresses.

Wideband Failures

Unlike single channel devices, the multi-channel wideband devices in FIG. 1 may not go completely offline or lose all connectivity when certain bonded channels 42 or 44 fail. In the HFC environment, each downstream or upstream frequency may also have markedly different reliability statistics for every location as a result of defects in the coaxial cable distribution network. For example, devices in the same or adjacent residences may experience similar communication failures, while HFC devices on the other side of the fiber node 28 or fed by different amplifiers 32 or different amplifier taps 34 may be wholly unaffected.

Ingress, intermodulation, common path distortion, hum modulation, or even a failed amplifier module 32 can negatively affect different combinations of the downstream channels 42 and/or the upstream channels 44. Sometimes only specific frequencies experience unacceptable bit error rates, while other frequencies are nearly error free. These failures are frequently time variable, and less than a 0.5 dB effective change in Carrier to Noise (C/N)/Signal to Noise (S/N) is sufficient to alter the bit error rate from better than $10^{-8}$ to $10^{-3}$, due to the high levels of Forward Error Correction (FEC). Variations in the C/N or S/N of 1-3 dBs are common throughout the day for a HFC network 10 of 1-3 cascaded amplifiers 32. As a result, there can be periods where the cable system 10 operates on the threshold of failure, oscillating from fully operational to failure.

Traffic engineering depends on wideband provisioned modems operating reliably with all provisioned RF interfaces working correctly. Faults existing on a small percentage of devices on some channels could cause traffic engineering models to fail. However, because each frequency on each downstream channel 42 and upstream channel 44 has its own C/N and SIN value, and the failure thresholds can be so close, some upstream channels 44 or downstream channels 42 may not experience any failures, while another channel completely fails.

A Wideband Failure Analytics (WFA) manager 22 identifies and correlates fault indicators across different downstream and/or upstream channels to more effectively identify faults in the wideband cable system 10. For example, the WFA manager 22 can generate fault indicators that allow a system administrator to identify a particular faulty network component, such as a particular cable amplifier 32 in FIG. 1. The added ability to correlate these fault indicators across different cable modems and different RF channels also allow the system administrator to identify the likely problem with the amplifier 32. For example, if only a sub-set of RF channels are experiencing the same condition, the fault may be attributed to a partial amplifier failure, as opposed to a complete amplifier failure which would disrupt all RF channels.

Maintenance Messages

Figure 2:
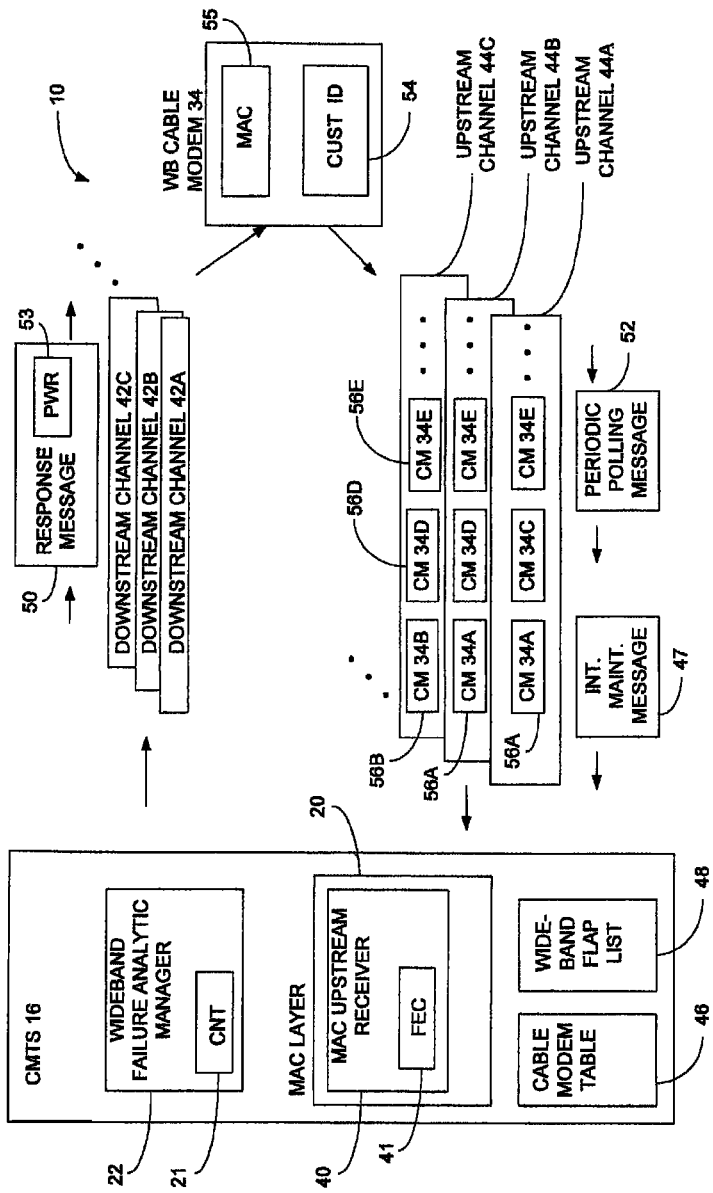
FIG. 2 is a more detailed diagram of the wideband cable modem system shown in FIG. 1.

FIG. 2 shows in greater detail how the wideband failure analytic manager 22 generates a wideband flap list 48 that tracks and correlates fault indicators across different RF channels. The MAC layer 20 is responsible for establishing the multiple different downstream channels 42 and upstream channels 44 between the CMTS 16 and the different cable modems 34. The MAC layer 20 is also responsible for assigning time slots 56 in the different upstream channels 44 to the different cable modems 34. A particular cable modem 34 then transmits data upstream to the CMTS 16 over the assigned time slots 56.

In the example shown in FIG. 2, a cable modem 34A transmits messages and data to the CMTS 16 over time slots 56A in upstream channels 44A and 44B. A second cable modem 34B transmits messages and data to the CMTS 16 only over time slot 56B in upstream channel 44C. Another cable modem 34E transmits messages and data to the CMTS 16 over time slots 56E in all three upstream channels 44A, 44B, and 44C. Of course these are just examples of any variety of different time slot assignments that can be assigned by the CMTS 16 to the different cable modems 34.

The MAC layer 20 in the CMTS 16 and the MAC 55 in the cable modems 34 are also responsible for sending out different maintenance messages as part of a link protocol that maintains communication connections between the CMTS 16 and all of the cable modems 34. These maintenance messages are referred by several different names, such as initial maintenance messages, periodic ranging messages, polling messages, and station maintenance messages.

The MAC device 55 operating in the cable modem 34 sends an initial maintenance message 47 that causes the CMTS 16 to insert the cable modem 34 into a polling list maintained in cable modem table 46. The MAC layer 20 in the CMTS 16 sends back a ranging response message 50 to the cable modem 34 acknowledging receipt of the initial maintenance message 47 and identifying a time interval in which to send polling messages (ranging request) 52 and data to the CMTS 16.

A time interval in the response message 50 identifies the timeslots 56 in the upstream channels 44 for the particular cable modem 34 to send the subsequent polling messages 52 and other data back to the CMTS 16. The subsequent polling (ranging request) messages 52 are periodically sent by the cable modems 34 during the identified timeslots 56 and are used by the CMTS 16 to determine if that cable modem 34 is still actively connected. The CMTS 16 sends response messages 50 back to the cable modems in response to the polling messages 52. The response messages 50 contain certain timing, power, equalization coefficient, and frequency adjustments requests 53 for a transmitter in the cable modem 34.

The CMTS 16 monitors for the polling messages 52 from particular cable modems 34 through their assigned time slots 56 on different upstream channels 44. The WFA manager 22 maintains one or more timeout counters 21 for each cable modem 34. The timeout counter 21 is reset to zero when the expected polling message 52 is successfully received from the associated cable modem 34 and incremented every time the expected polling message 52 is repeatedly not received from the associated cable modem 34.

Successfully receiving a polling message is considered a "hit" by the WFA manager 22 and not receiving an expected polling message is considered a "miss". The CMTS 16 continues to issue response messages 50 to cable modems 34 as long as the associated time-out counters have not exceeded some configurable threshold value (for example, 16 consecutive misses). If the threshold value has been reached, the CMTS 16 drops the cable modem 34 from the polling list in cable modem table 46 and the communication link between the CMTS 16 and the cable modem 34 is considered terminated.

At this point the cable modem 34 can be brought back online by resetting the cable modem 34 and beginning again. If the cable modem 34 is dropped from cable modem table 46 and brought back online shortly thereafter, such as within a few minutes, there is likely a problem with the cable modem 34, since the modem 34 was probably not turned off intentionally by the subscriber. If there are other modems in the same vicinity experiencing the same problem, there is possibly a faulty component in the common path leading to those cable modems 34. If only one or two adjacent neighboring modems are problematic, then the problem could lie in the cable section between the closest CATV tap 34 (FIG. 1) and the problematic cable modems.

Power Adjustments

As mentioned above, the CMTS 16 sends power adjustment requests 53 to the different cable modems 34. The power adjustment requests 53 depend on the received amplitude of the message associated with data received by the CMTS 16 over the upstream channels 44 from the cable modems. The MAC layer 20 monitors the different receive amplitudes and sends power adjustment requests 53 that are used by the cable modems 34 to adjust internal transmitter power levels. A substantial number of power adjustment requests 53 within a particular time periods, oscillations between higher and lower required power, or a large enough overall power adjustment, could indicate a component problem on a particular upstream channel 44.

FEC Errors

A MAC upstream receiver module 40 receives packets containing messages and data from the different cable modems 34 over the different time slots 56 on the different upstream channels 44. The MAC receiver module 40 may perform Forward Error Correction (FEC) 41, or some other type of correction scheme, to correct corrupted or lost data bits in the received packets. If there is too much corrupted or lost data in a particular packet, the data cannot be corrected using FEC 41. The amount of correctable or uncorrectable data received from the different cable modems on each of the different upstream channels is tracked by the WFA manager 22 and used for identifying possible faults in the cable system 10.

Data Formats

If logical channels or mixed modulation formats are used, such as DOCSIS 2.0 Synchronous Code Division Multiple Access (SCDMA)/Advanced Time Division Multiplex Access (A-TDMA), the WFA manager 22 can segregate fault indicators associated with each different modulation format. For example, periodic maintenance messages 47, 50 and 52, or bandwidth request messages may use a lower modulation order than the modulation used for transmitting data. Especially compared to a-long, long, a-ugs, and a-short burst types used in a mixed TDMA/A-TDMA environment.

By segregating fault indicators according to modulation format, the WFA manager 22 can more effectively identify data traffic errors where cable modems stay online, but may not send traffic reliably. Further, the WFA manager 22 can also differentiate failures associated with maintenance messages that use a first modulation format from failures associated with normal data transfers that may use a different modulation format.

Downstream Failures

Online (narrowband online) refers to a cable modem 34 that is configured to operate with a single primary downstream channel and a single working upstream channel. Wideband online refers to a cable modem that is configured to operate with more than one primary downstream and/or upstream channel. A transition between wideband online and narrowband online typically occurs when the cable modem fails to successfully receive data over certain downstream channels 42.

A primary downstream channel is defined as a downstream channel 42 which contains signaling, timing and control messages defining upstream transmissions. A non-primary downstream channel is defined as any channel not containing such messages. A cable modem is said to bond a primary and one or more non-primary channels when there is a functioning data path between the CM and the CMTS on those channels.

The WFA manager 22 may have limited visibility to cable modems 34 losing non-primary bonded downstream channels 42. Loss of downstream channels prevents the cable modem from receiving data that the CMTS 16 stripes across multiple downstream RF frequencies. This results in an effective reduction in network capacity, and reduces queuing efficiency from the CMTS to the CM. However, the CMTS 16 may try and maintain the same wideband Quality of Service (QoS) originally provisioned for the cable modem by increasing the bandwidth allocated on the single narrowband downstream channel. This can lead to severe congestion on the downstream channels 42.

DOCSIS 3.0 allows the cable modems 34 to send MAC massages upstream to the CMTS 16 identifying the lost downstream channels. The WFA manager 22 can use these MAC messages to track the cable modem, the lost downstream channels, and the time associated with the lost downstream channel.

However, a failure on a downstream channel close to the CMTS 16 could initiate a barrage of these MAC messages from every cable modem losing connection to the failed downstream channel. This barrage of MAC messages could use substantial bandwidth on the upstream channels 44.

In another embodiment, the WFA manger 22 identifies certain downstream channel failures by tracking unexpected cable modem transitions between a wideband online mode and a narrowband online mode, both with and without the MAC message indicating a transition, including a transition from wideband online to offline to narrowband online, without a return to wideband online.

Correlating Faults

The WFA manager 22 can correlate the complete loss of all communication on one or more upstream channels, without the loss of all upstream channels. In this case, a cable modem 34 has not gone completely "offline", but has only lost significant upstream capacity. These types of faults can be tallied and correlated to a specific group of cable modems that may experience similar faults at around the same time. The WFA manager 22 can correlate different fault indicators across different cable modems 34 and RF channels and assign group identifiers to the cable modems experiencing similar faults. The group identifiers can help identify not only the location of "common failure elements" but also provide insight into the possible cause of the fault.

The WFA manager 22 can also determine when only a subset of all cable modems on an upstream receiver port are affected by a fault condition. For example, a malfunctioning upstream amplifier 32 may operate reliability with one or two partially used upstream channels 44. However, the upstream amplifier 32 may fail and go nonlinear as traffic load increases on the two upstream channels 44. Any combination of an incorrectly aligned return path, coax "suck out", or overloaded Fabry Perot return path laser may all create this symptom. The return path network may also appear to favor some RF frequencies over others in terms of packet loss due to the ever present underlying noise floor/interference signals, or non-linear characteristics specific to certain locations in the network.

In yet another embodiment, the WFA manager 22 correlates all of the different fault indicators for the same modem over all of the different upstream and/or downstream channels. This type of correlation may identify a particular cable modem or group of cable modems that have lost all communications.

In another embodiment, the WFA manager 22 identifies the worst fault indications for all of the different modems on all of the different RF channels. The largest number, or largest percentage, of fault indicators per cable modem, per RF channel, or for all channels is identified.

Any of the fault indicators can also be correlated by assigning group identifiers to cable modems experiencing similar fault conditions, such as a flap or series of flaps, within a single MAC domain or fiber node (n downstream x n upstream) within a configurable duration of each other, such as 1-60 seconds.

It should be noted that the maintenance messages 47, 50, and 52, FEC 41, power adjustments 53, and online transition notifications are already performed in MAC layer 20. Therefore, extracting fault analytics from these operations does not significantly impact processing bandwidth, transmission bandwidth, or require a significant change to existing cable modem operations or DOCSIS MAC software. As also explained above, the WFA manager 22 tracks these faults over different cable modems and different RF channels. By correlating these faults over different cable modems and RF channels, faults can be identified or isolated that would normally not be detectable with existing narrowband fault monitoring schemes.

Wideband Flap List

Figure 3:
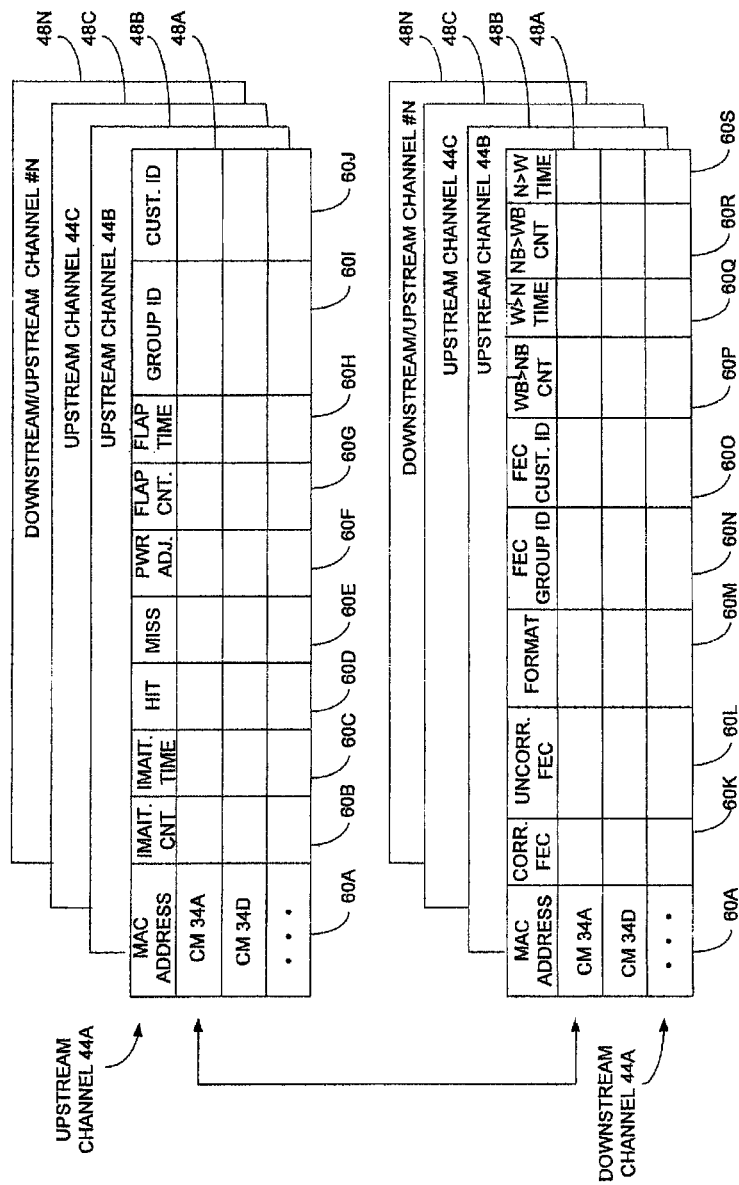
FIG. 3 shows one example of a wideband flap list that tracks fault indicators for different cable modems and upstream and/or downstream channels.

FIG. 3 is a block diagram showing various fields in the wideband flap list 48 previously shown in FIG. 2. In some embodiments, some of the entries in FIG. 3 may be contained in the cable modem table 46 previously shown in FIG. 2 and other entries may be contained in the wideband flap list 48. The term "flap" or "flap list" sometimes refers to cable network analytics that identify cable modems that go offline due to actual or potential failures. However, the terms flap, flap data, flap list, etc. are used in the present application to refer to any analytic data or information that may by associated with any type of potential or actual failure or fault in the cable system 10.

The wideband flap list 48 contains a field 60A for storing MAC addresses that associate fault indicators with particular cable modems 34. The MAC address can also act as a reference pointer to other data records in the cable modem table 46 that may contain other fault indicators for the same cable modem.

Alternatively, a separate identifier or another field can be used as a reference pointer when correlating different fault indicators in the cable modem table 46 and wideband flap list 48. It should also be understood that the cable modem table 46 and wideband flap list 48 can be organized or displayed in any variety of different formats and the organization described in FIG. 3 is just one example.

In one embodiment, the fault indicators are captured and indexed with a particular cable modem 34 and upstream and/or downstream channel. For example, table 48A contains the hits, misses, power adjustments, and other fault indicators associated with upstream channel 44A in FIG. 2. Similarly, table 48B contains the fault indicators for cable modems associated with upstream channel 44B. Other tables 48N are associated with other upstream channels 44 and downstream channels 42.

Field 60B tracks the number of insertion events that take place when a cable modem initially connects to the cable system 10. As described above in FIG. 2, field 60B tracks the number of initial maintenance messages 47 sent by particular cable modems within some time period identified in field 60C.

Field 60D tracks the number of periodic polling messages 52 successfully received (hits) for a particular cable modem 34 on a particular upstream channel 44. Field 60E tracks the successive number of expected periodic maintenance message 52 that were not successfully received (miss), since the last successfully received polling message 52.

Field 60F identifies the power adjustment requests 53 (FIG. 2) sent to a particular cable modem 34 by the CMTS 16 for a particular upstream channel 44. The power adjustment value in field 60F may also be associated with the absolute value of the cumulative power adjustment sent to the cable modem for the associated upstream channel 44. The power adjustment value in field 60F could also track the overall number of power adjustment requests 53 sent by the CMTS 16 to a particular cable modem, for a particular upstream channel, within a configurable time period.

More detail on particular schemes used for tracking the initial maintenance message counts, hit and misses for the periodic maintenance messages, power adjustment changes, and flap counts for cable modems in a single channel narrowband cable modem system are described in U.S. Pat. No. 6,973,668 which is herein incorporated by reference in its entirety. However, it should be understood that other schemes can also be used for tracking statistics for these potential cable modem failure conditions.

Field 60G is a flap count tracking the number of times entries for a particular cable modem and a particular RF channel were created or updated in wideband flap list 48. Field 60H identifies when the entry was created or last updated for a particular cable modem for a particular upstream or downstream channel. The flap count in field 60G and the flap time in field 60H can also be associated with particular events or thresholds. For example, one flap count may be incremented each time the initial maintenance count in field 60B reaches a particular configurable threshold, another flap count may be incremented each time the number of polling message misses in field 60E reach a particular configurable threshold, and another flap count may be incremented each time the number of power adjustment changes in field 60F reach a configurable threshold.

If there are other cable modems in the same vicinity experiencing the same problem, there is likely a faulty component in a common path leading to those cable modems. Certain faults are correlated to a particular set of modems on a particular upstream or downstream channel using the group identifier (group Id) in field 60I and the customer identifier (customer Id) in field 60J.

The group Id in field 60I identifies different cable modems on the same RF channel, or the same cable modem on different RF channels, that have similar faults. For example, two different cable modems may exceed a threshold number of misses in field 60E within a same configurable time period. Accordingly, the WFA manager 22 assigns each of the two cable modems a same group Id value in field 60I. The group Id values can be assigned to any combination of cable modems and any combination of upstream or downstream channels for any configurable combination of monitored events. In another example, a common group Id may be assigned to different cable modems that are associated with some threshold number or percentage of uncorrected FEC errors in field 60L and a second threshold number of misses in field 60E. Because separate fault indicators are indexed to particular cable modems and particular RF channels, a variety of different combinations of cable modems, RF channels, and faults indicators can be correlated with each other to isolate network device failures.

A customer Id value in field 60J identifies cable modems located within the same subscriber premises. For example, a subscriber home or office may include multiple cable modems. The WFA manager 22 can identify cable modem MAC addresses and faults indicators for different modems all located within the subscriber residence. The customer Id 54 (FIG. 2) is loaded into a configuration file in each of the different cable modems associated with the same subscriber. For example, a network administrator may load the customer Id 54 from management station 15 (FIG. 1) into the different cable modems via internet 12.

The customer Id can be contained in the registration request message sent from the cable modems to the CMTS 16 during registration and the MAC 20 can track these customer Ids in the cable modem table 46. When an entry is created in wideband flap list 48, the WFA manager 22 can assign the entry the corresponding customer Id in field 60J. The customer Id helps a system administrator identify faults that may be associated with a particular cable TV tap 34 or particular coaxial connection from the cable TV tap into the subscriber premises.

Field 60K identifies the number or percentage of correctable FEC errors associated with the data received from a particular cable modem 34 on a particular upstream channel 44. Field 60L identifies the number or percentage of non-correctable FEC errors associated with the data received from a particular cable modem 34 on a particular upstream channel 44. For example, the MAC upstream receiver 40 (FIG. 2) uses Forward Error Correction (FEC) module 41 to correct lost or corrupted bits in packets received over the upstream channels 44. The upstream receiver 40 identifies the number of data bits that are corrected using FEC 41 and also identifies the number of bits of data that cannot be corrected. The WFA manager 22 then loads the correctable and uncorrectable data analytics into fields 60K and 60L, respectively.

Additional columns may be created containing a ratio of correctable/uncorrectable FEC errors/FEC blocks to total blocks transmitted, providing relative reliability and packet loss statistics.

A format field 60M can be used to identify a particular modulation format associated with any particular fault conditions or fault indicators. For example, maintenance messages 50 and 52 may be modulated differently than normal packet data transmissions. Thus, burst type data transmissions may be assigned a different value in field 60M than non-burst type data transmissions. Another field in flap list 48 (not shown) can also track Cyclic Redundancy Check (CRCs) errors associated with each modem on each RF channel.

Similar to the fields 60I and 60J, fields 60N and 60O can be used to assign a group ID and/or customer ID, respectively, to different cable modems that have similar correctable or non-correctable FEC errors. For example, two cable modems 34 may have each generated a certain percentage of non-correctable FEC errors above some configurable threshold within some configurable time period on the same upstream channel 44A. The WFA manager 22 can assign each of the two cable modems a common FEC group Id in field 60N.

If multiple cable modems with the same customer Id 54 (FIG. 2) have some threshold number of correctable or uncorrectable errors within some configurable time period, the WFA manager 22 can assign the identified cable modems the same group Id in field 60N.

Field 60P identifies the number of unexpected cable modem transitions from wideband online to narrowband online and field 60Q identifies when the last transition happened. Field 60R identifies the number of unexpected cable modem transitions from narrowband online to wideband online and field 60S identifies when the last transition happened. Another field could also be used for tracking the total number of both wideband to narrowband transitions and narrowband to wideband transitions.

Figure 4:
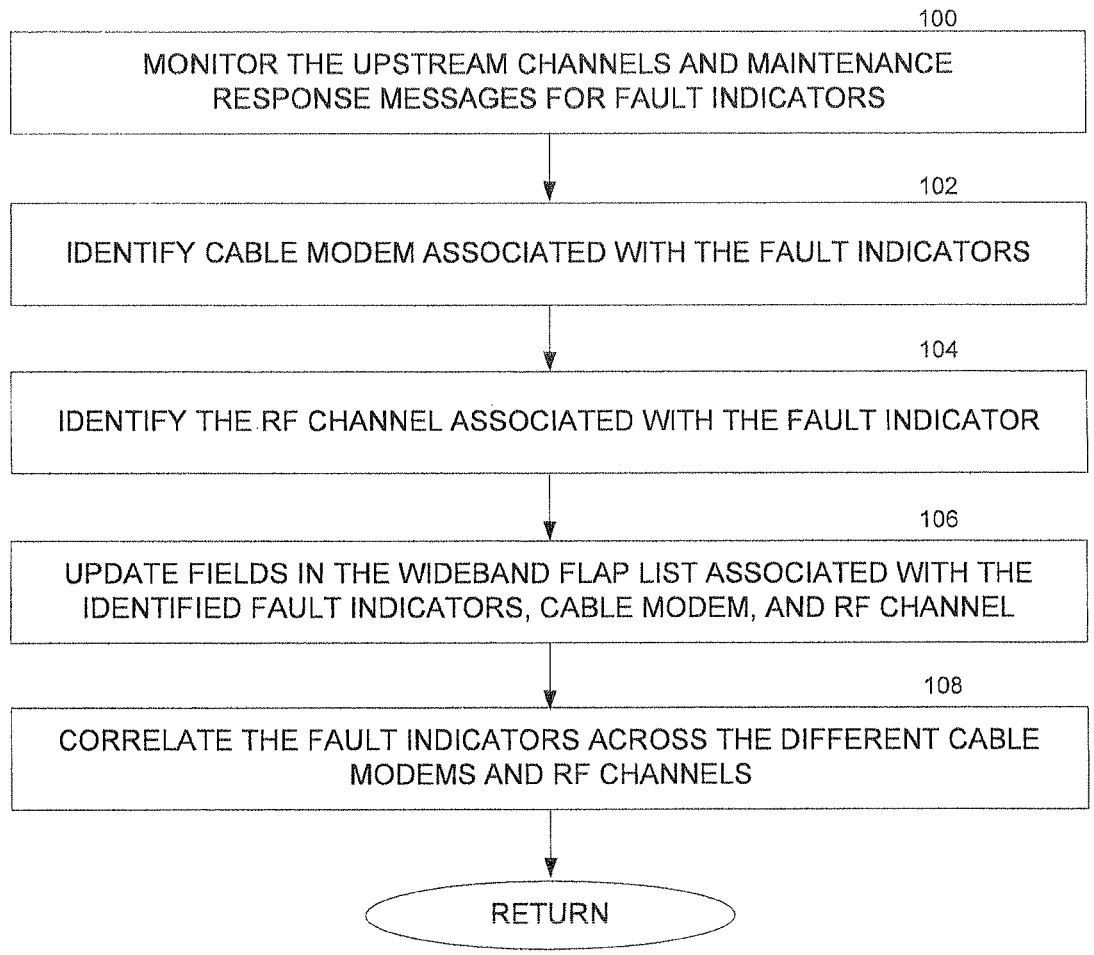
FIG. 4 is a flow diagram showing how fault indicators are tracked for different cable modems and RF channels.

FIG. 4 shows in more detail one example of how the WFA manager 22 generates entries in the wideband flap list 48. In operation 100, the MAC layer 20 in CMTS 16 monitors the upstream channels 44 for the different initial maintenance messages 47, polling messages 52, power adjustments 53, FEC data, equalization coefficient data, and wideband/narrowband transitions that may be associated with fault conditions (fault indicators). The WFA manger 22 in operation 102 identifies the cable modem associated with the detected fault indicators and in operation 104 identifies the upstream or downstream channel associated with the fault indicator.

The WFA manager 22 in operation 106 then updates fields in the wideband flap list 48 associated with the identified fault indicator, cable modem, and RF channel. For example, when a missed polling message 52 is detected, the WFA manager 22 increments the count value in field 60E in the table 48 for the cable modem 34 and upstream channel 44 where the polling message was expected to be received.

The WFA manager 22 in operation 108 may periodically correlate all of the fault indicators in the wideband flap list 48 across the different cable modems and different RF channels. For example, the top ten fault conditions in the wideband flap list 48 may be identified and reported to the network manager. For instance, once each hour, once each day, etc. the WFA manager 22 can identify the ten modems that have the largest number or percentage of polling message misses, power adjustments, FEC errors, and/or online transitions, etc. on each of the different RF channels.

Figure 5:
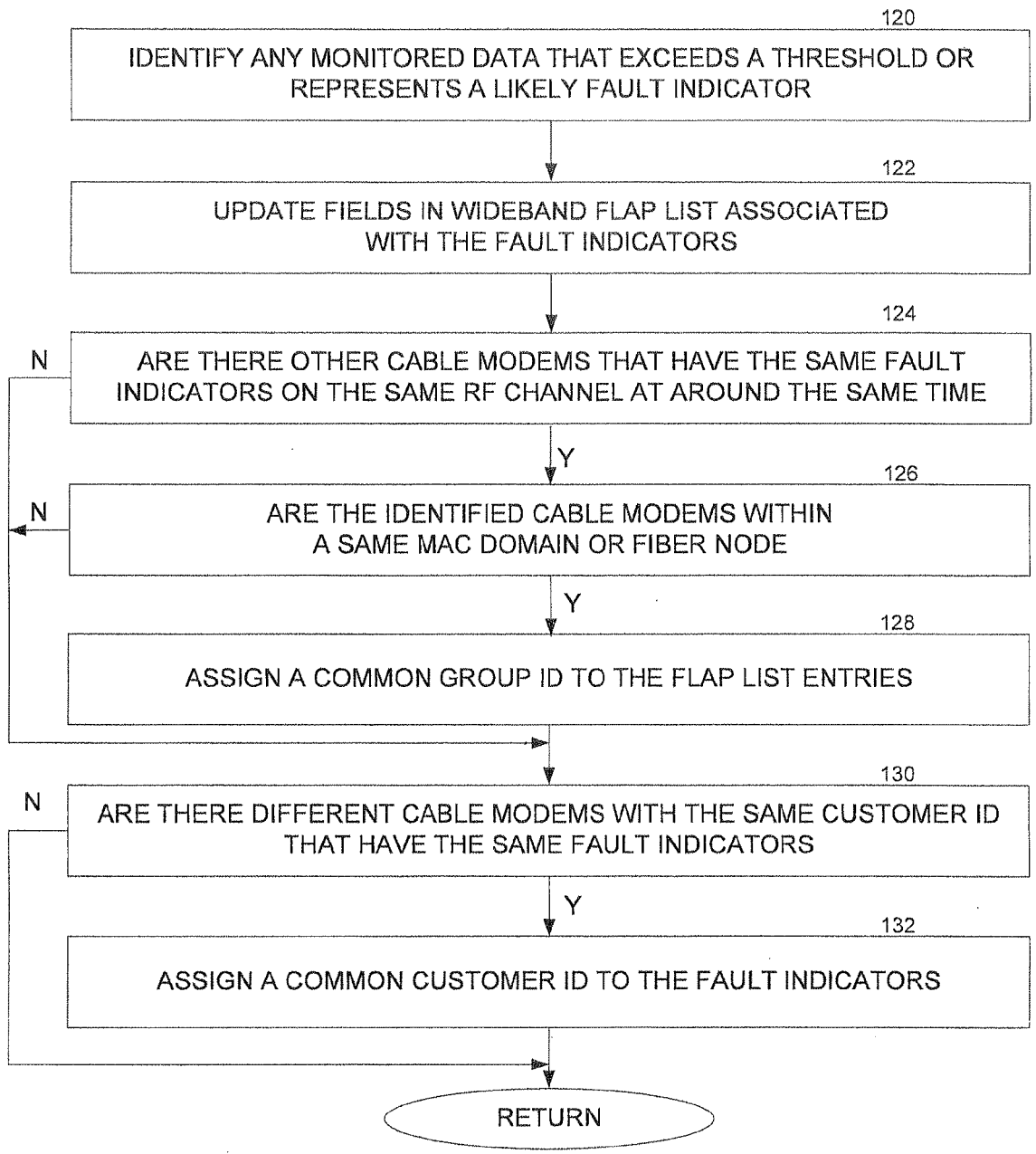
FIG. 5 is a flow diagram showing how the failure analytic manager in FIG. 1 correlates fault indicators across different cable modems and RF channels.

FIG. 5 shows in more detail one example of how the group Id and customer Id may be assigned to different cable modems and fault indicators. In operation 120, the WFA manager 22 identifies entries in the wideband flap list 48 that may exceed a particular threshold or that identify a likely fault condition. For example, a cable modem that sends a certain number of initial maintenance messages 47 within a particular time period, misses a consecutive number of polling messages 52, or has a particular percentage of uncorrectable FEC errors may indicate a likely cable system fault.

The entries in the wideband flap list 48 associated with the fault indicators are updated in operation 122. In operation 124, the WFA manager 22 determines if other cable modems have a similar fault indicator on the same RF channel at around the same time. For example, two different cable modems 34 may have reached the same threshold number of consecutive polling message misses within a same time period. The WFA manger 22 in operation 126 may optionally determine if the two cable modems are within a same MAC domain or located on the same fiber node.

A MAC domain is pre-configured on the CMTS to consist of one or more upstream and one or more downstream interfaces. A MAC domain may service one or more fiber nodes (as per 24, 26 and 28 in FIG. 1). The CMTS 16 always knows which upstreams and downstreams have connectivity to a given CM. If a single MAC domain services multiple fiber nodes 28, the CMTS 16 may have more difficulty determining which modems share a single fiber node.

There is a second arrangement of a fiber node in the wideband CMTS configuration, whereby a collection of MAC domains may be assigned to exist in a single fiber node, and the CMTS 16 is able to move modems from one MAC domain to another MAC domain within that fiber node. By defining the fiber node to consist of multiple MAC domains on the CMTS 16, an operator has communicated the physical topology of the network to the CMTS 16. If so, then the two cable modems are assigned the same group Id value in field 60I.

In yet another embodiment, the WFA manager 22 in operation 130 determines if any cable modems with particular fault indicators have a same customer Id. For example, the two different cable modems located in the same subscriber residence may each have a number of power adjustments that exceed a predetermined threshold. The WFA manager 22 in operation 132 enters the same customer Id value into field 60J for the two MAC addresses and the two upstream channels corresponding to the power adjustment fields 60F.

Figure 6:
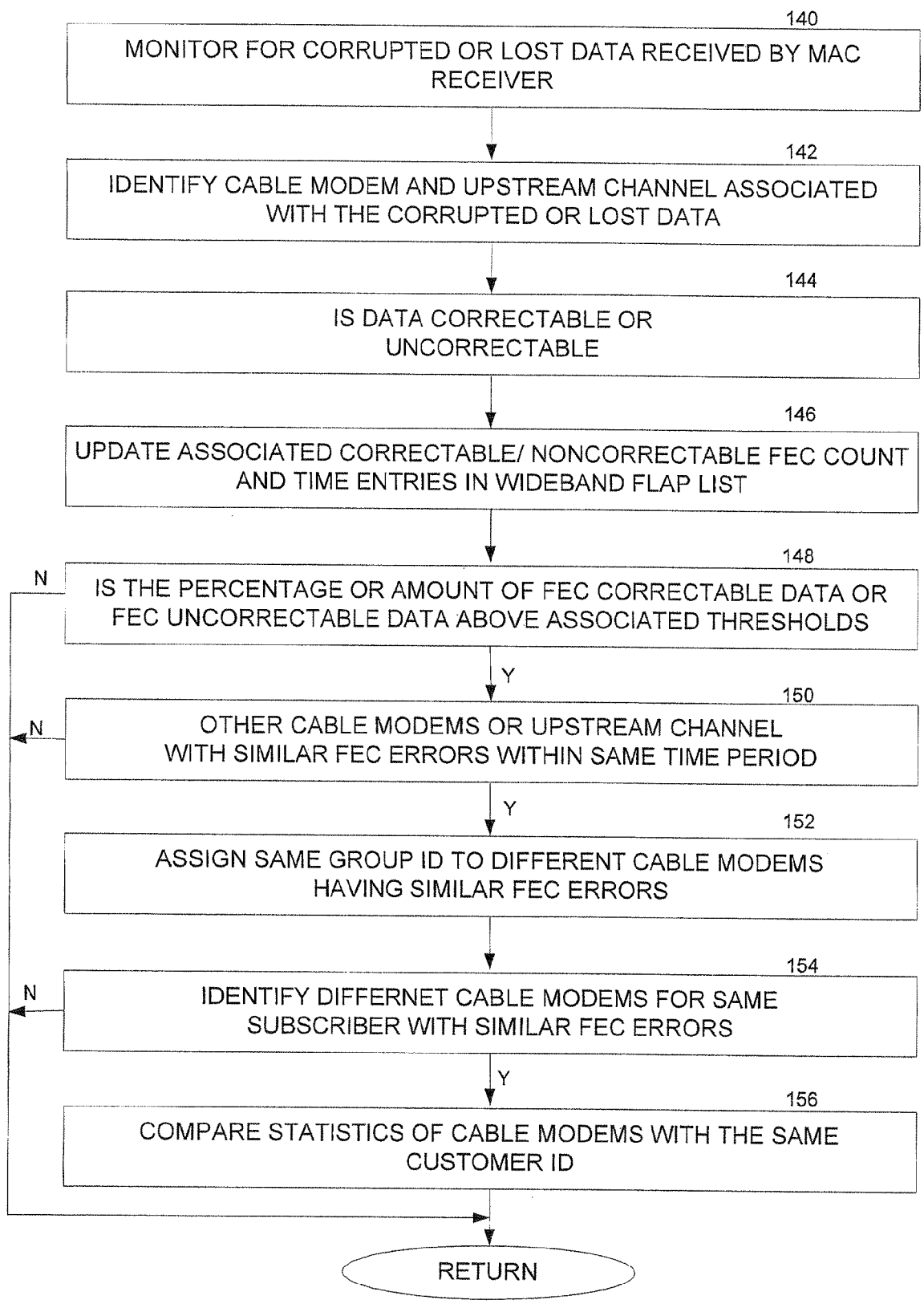
FIG. 6 is a flow diagram showing how fault indicators are generated and correlated for corrupted or lost data.

FIG. 6 shows how corrupted or lost bits on the upstream channels 44 can be used to identify possible faults in the cable system 10. The WFA manager 22 in operation 140 monitors for corrupted or lost data identified by the MAC upstream receiver 40 (FIG. 2). The cable modem and upstream channel associated with the corrupted data is identified in operation 142. Operation 144 determines if the corrupted or lost data is correctable or uncorrectable by the error correction scheme used by MAC 20, such as by using Forward Error Correction (FEC). If too many bits are corrupted or lost in a particular data packet, FEC cannot correct the bit errors.

The WFA manager 22 in operation 146 identifies the number or percentage of correctable and uncorrectable bit errors. In other embodiments, all of the correctable or uncorrectable bit errors may be counted together. In yet another embodiment, only correctable or uncorrectable bit errors are tracked. The fields 60K and/or 60L in flap list 48 are then updated for the associated cable modem and upstream channel 44. Time fields in list 48 (not shown) may also identify when the entries in fields 60K and 60L were last incremented.

If the percentage or amount of correctable or uncorrectable data is above some threshold in operation 148, the WFA manager 22 in operation 150 may determine if there are other cable modems or upstream channels with similar FEC thresholds. Cable modems or upstream channels that reach a similar FEC threshold can be assigned a same group Id value in field 60N during operation 152. The WFA manager 22 in operation 154 can determine if other cable modems with the same customer identifier have similar FEC errors. If the CMTS 16 finds fault with two devices with the same customer Id, the fault is likely outside the house. If the CMTS finds that two devices with the same customer Id do not share faults but do share RF paths, then the problem is likely inside the house.

Figure 7:
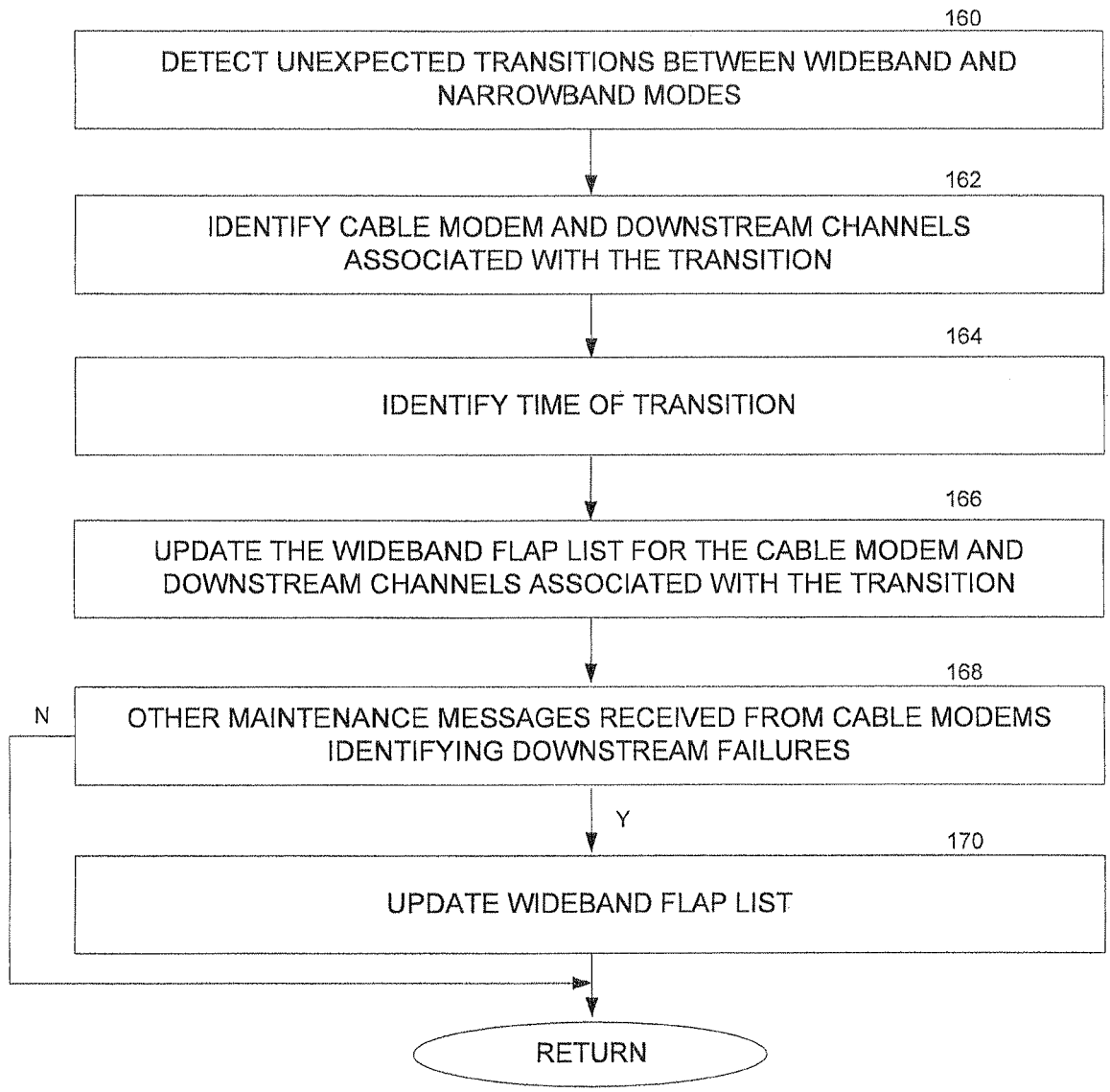
FIG. 7 is a flow diagram showing how fault indicators are generated for unexpected cable modem transitions between wideband and narrowband online modes.

FIG. 7 shows one example of how the WFA manger 22 tracks fault conditions associated with unexpected wideband and narrowband transitions. As explained above, the cable modems 34 may not go completely offline when failures happen on only a subset of downstream channels 42. Instead, the cable modem 34 may transition from wideband online to narrowband online. In other situations, the cable modem may go completely offline and then return to narrowband online without moving to wideband online.

Any unexpected transitions between wideband online and narrowband online modes are detected in operation 160. The WFA manager 22 identifies the cable modem and possibly the downstream channels dropped or added during the transition in operation 162 and identifies the time of the last transition in operation 164. The wideband flap list is then updated in operation 166. For example, the number of wideband to narrowband transitions are tracked in field 60P (FIG. 3) and the time of the last wideband to narrowband transitions is tracked in field 60Q. The number of narrowband to wideband transitions are tracked in field 60R and the time of the last narrowband to wideband transition is tracked in field 60S. While not shown, the WFA manager 22 can also assign group Ids to different cable modems with any combination of similar wideband/narrowband transitions.

Other downstream data may be recorded in the flap list 48. For example, the cable modems have the option of sending separate maintenance messages to the CMTS 16 whenever a failure is detected on a particular downstream channel 42. If this feature is configured for cable modems in a particular cable system in operation 168, the WFA manager 22 in operation 170 monitors the downstream channel failure messages and tracks the particular cable modems 34 and associated failed downstream channels in the wideband flap list 48.

The WFA manager 22 can automatically send a message to a network management station 15 (FIG. 1) whenever any of the fault indicators described above reach some particular threshold. A network administrator can then view the wideband flap list 48 sent from the CMTS 16 to help determine the cause of the particular fault.

The system described above can use dedicated processor systems, micro controllers, programmable logic devices, or microprocessors that perform some or all of the operations. Some of the operations described above may be implemented in software, such as computer readable instructions contained on a storage media, or the same or other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

References above have been made in detail to preferred embodiment. Examples of the preferred embodiments were illustrated in the referenced drawings. While preferred embodiments where described, it should be understood that this is not intended to limit the invention to one preferred embodiment. To the contrary, it is intended to cover alternatives, modifications, and equivalents as may be included within the spirit and scope of the invention as defined by the appended claims.

Having described and illustrated the principles of the invention in a preferred embodiment thereof, it should be apparent that the invention may be modified in arrangement and detail without departing from such principles. We/I claim all modifications and variation coming within the spirit and scope of the following claims.

The invention claimed is:

1. A method comprising:
monitoring, by a processing device, a network for fault indicators associated with different remote devices and different network channels;
generating, by the processing device, entries that track the fault indicators and identify the different remote devices and the different network channels associated with the monitored fault indicators;
tracking, by the processing device, transitions of the remote devices between a wideband online mode and a narrowband online mode; and
identifying, by the processing device, how many of the transitions are made by the different remote devices.

2. The method of claim 1, further comprising:
correlating groups of the entries in tables associated with the fault indicators over the different remote devices and over the different network channels; and
identifying fault conditions associated with the groups of the entries.

3. The method of claim 1, further comprising:
monitoring for periodic maintenance messages from different cable modems over different upstream channels in a Hybrid Fiber Coaxial (HFC) plant;
tracking hits on the different upstream channels when the periodic maintenance messages are successfully received from the cable modems;
tracking misses on the different upstream channels when the periodic maintenance messages are not successfully received from the cable modems; and
updating tables to identify a number of the hits and a number of the misses for the different cable modems on the different upstream channels.

4. The method of claim 1, further comprising:
tracking an amount of corrupted or lost data received from the different remote devices on the different network channels; and
updating tables to identify an amount or percentage of corrupted or lost data received from the different remote devices on the different network channels.

5. The method of claim 1, further comprising:
tracking an amount of correctable corrupted or lost data received from the different remote devices on the different network channels;
tracking an amount of uncorrectable corrupted or lost data received from the different remote devices and the different network channels; and
updating tables to identify an amount or percentage of correctable and uncorrectable corrupted or lost data received from the different remote devices on the different network channels.

6. The method of claim 1, further comprising:
tracking modulation formats used for transmitting the fault indicators; and
correlating at least some of the fault indicators with the modulation formats.

7. The method of claim 1, further comprising:
preventing the remote devices from operating in the wideband online mode when the remote devices have a number of unexpected transitions above a threshold; or
reducing a Quality of Service (QoS) for the remote devices when the remote devices have a number of unexpected transitions above the threshold.

8. The method of claim 1, further comprising:
identifying, by the processing device, similar fault indicators associated with same network channels and different remote devices; and
assigning, by the processing device, a same group identifier to the identified similar fault indicators.

9. The method of claim 1, further comprising:
identifying the fault indicators associated with a same subscriber and different remote devices; and
using a customer identifier to differentiate a fault inside a house from a fault outside the house.

10. An apparatus, comprising:
a processor configured to:
monitor different individual upstream channels for messages or data received from different devices,
generate entries that provide fault analytics from the monitored messages or data, the fault analytics associated with possible fault conditions in a network, and track the fault analytics for each of the different upstream channels, wherein at least some of the entries provide fault analytics for multiple different upstream channels used by same ones of the different devices as at least one bonded upstream channel; and
identify different groups of the entries associated with the different upstream channels that index the fault analytics to the different devices and to the different individual upstream channels for identifying a fault condition associated with the at least one bonded upstream channel;
wherein the processor is further configured to:
tally unexpected device transitions between a multi-channel wideband mode and a single channel narrowband mode; and
generate the fault analytics for the different devices according to the tallied unexpected device transitions.

11. The apparatus according to claim 10 wherein the network is a Hybrid Fiber Coaxial (RFC) cable network, the processor operates in a Cable Modem Termination System (CMTS), and the devices are cable modems.

12. The apparatus according to claim 10 wherein the processor is further configured to correlate the fault analytics that occur at around the same time period over the different devices and the different upstream channels.

13. The apparatus according to claim 10 wherein the processor is further configured to extract the fault analytics for each of the different individual upstream channels from MAC maintenance messages received over the different individual upstream channels.

14. The apparatus according to claim 10 wherein the processor is further configured to:
identify the different devices having related fault analytics; and
assign a same identifier to the related fault analytics.

15. The apparatus according to claim 10 wherein the processor is further configured to:
tally corrupted or lost data on each of the upstream channels; and
generate the fault analytics for each of the upstream channels according to the tallied corrupted or lost data.

16. A cable network system, comprising:
a Cable Modem Termination System (CMTS) configured to operate a Media Access Control (MAC) layer and communicate with cable modems over multiple different Radio Frequency (RF) downstream and upstream channels, wherein the CMTS is configured to:
operate a wideband failure analytic manager that tracks the MAC layer communications on the different upstream channels;
generate fault indicators corresponding to the different cable modems and the different upstream channels, wherein at least some of the fault indicators identify faults for multiple different upstream channels used by same ones of the cable modems as at least one bonded upstream channel; and
correlate the fault indicators for different groups of the different upstream channels associated with different groups of the cable modems for identifying a fault condition associated with the at least one bonded upstream channel;
wherein the wideband failure analytic manager is further configured to:
track MAC maintenance messages on each of the upstream channels;
track corrupted or lost data on each of the upstream channels;
track unexpected cable modem transitions between a wideband mode and a narrowband mode; and
generate the fault indicators for the cable modems on each of the different upstream channels according to the tracked MAC maintenance messages, tracked corrupted or lost data, and tracked unexpected cable modem transitions.

17. The cable network system according to claim 16 wherein the failure analytic manager is further configured to correlate groups of the fault indicators with the different cable modems and the different upstream channels.

* * * * *